United States Patent
Dorn et al.

(10) Patent No.: US 7,523,471 B1
(45) Date of Patent: Apr. 21, 2009

(54) INTERPRETIVE NETWORK DAEMON IMPLEMENTED BY GENERIC MAIN OBJECT

(75) Inventors: Karlheinz Dorn, Kalchreuth (DE); Dietrich Quehl, Erlangen (DE); Detlef Becker, Moehrendorf (DE); Christian Scharf, Weisendorf (DE); Douglas C. Schmidt, St. Louis, MO (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/215,732

(22) Filed: Dec. 18, 1998

(51) Int. Cl.
*G06F 9/44* (2006.01)
*G06F 15/16* (2006.01)

(52) U.S. Cl. ............ 719/331; 709/227; 717/116; 719/316

(58) Field of Classification Search .......... 713/1, 713/100; 719/331–332, 316; 717/162–167, 717/116; 709/201–207, 217–219, 220–222, 709/227
See application file for complete search history.

(56) References Cited

U.S. PATENT DOCUMENTS

| | | | | |
|---|---|---|---|---|
| 5,175,828 A | * | 12/1992 | Hall et al. | 719/331 |
| 5,491,800 A | * | 2/1996 | Goldsmith et al. | 709/221 |
| 5,625,783 A | * | 4/1997 | Ezekiel et al. | 719/320 |
| 5,634,114 A | * | 5/1997 | Shipley | 717/170 |
| 5,664,155 A | * | 9/1997 | Elko et al. | 711/170 |
| 5,781,902 A | * | 7/1998 | Waszkiewicz | 707/10 |
| 5,850,518 A | * | 12/1998 | Northrup | 709/203 |
| 5,893,106 A | * | 4/1999 | Brobst et al. | 707/102 |
| 5,913,061 A | * | 6/1999 | Gupta et al. | 709/310 |
| 5,916,308 A | * | 6/1999 | Duncan et al. | 719/331 |
| 6,047,324 A | * | 4/2000 | Ford et al. | 709/227 |
| 6,158,049 A | * | 12/2000 | Goodwin et al. | 717/158 |
| 6,434,740 B1 | * | 8/2002 | Monday et al. | 717/108 |

OTHER PUBLICATIONS

Prashant Jain et. al "Dynamically Configuring Communication Services with the Service Configurator Pattern" Jun. 1997 C++ Report Magazine pp. 1-13.*
Schmidt Craig Douglas "An Object-Oriented Framework for Experimenting with Alternative Process Architectures for Parallelizing Communication Subsystems" 1995 University of California Irvine p. 91-97.*
Gamma Erich "Design Pattern" 1995 Addison Wesley Longman, Inc. pp. 24 and 87-88.*
Prashant et al. "Dynamically Configuring Communication Services with the Service Configurator Pattern" Washington University pp. 1-13.*
Schmidt "An Object-Oriented Framework for Experminenting with Alternative Process Architectures for Paralleling Communication Subsystems" University of California pp. 1-147.*
Gamma et al. "Design Patterns Elements of Reusable Object-Oriented Software" 1995 Addison Wesley Longman, Inc. pp. 24 and 87-88.*

(Continued)

*Primary Examiner*—Meng-Ai An
*Assistant Examiner*—Charles E Anya
(74) *Attorney, Agent, or Firm*—Schiff Hardin LLP (57) ABSTRACT

A main module of an object oriented computer program is independent of the software domain and can be dynamically configured or reconfigured at runtime by domain specific dynamic link libraries. This main module is a generic main which is configured by a service configurator. A framework connector is provided as are a communications component and a asynchronous/asychronous management component.

4 Claims, 10 Drawing Sheets

OTHER PUBLICATIONS

Schmidt "An Object-Oriented Framework for Expermenting with Alternative Process Architectures for Parallelizing Communication Subsystem" University of California pp. 1-147.*

Gamma et al. "Design Patterns" Addison Wesley pp. 87-88.*

IBM TDBD NN910792 "Generic Program for Starting Executables" IBM Jul. 1, 1991 pp. 1-2.*

* cited by examiner

INTERPRETIVE NETWORK DAEMON IMPLEMENTED BY GENERIC MAIN OBJECT

BACKGROUND OF THE INVENTION

1. Field of the Invention

The present invention relates to generally to a generic main computer program module that is dynamically configured at run time, and in particular to a network daemon using a service configuration pattern to configure a generic main object in a network computing environment.

2. Description of the Related Art

As set forth in U.S. Pat. No. 5,499,365, full incorporated herein by reference, object oriented programming systems and processes, also referred to as "object oriented computing environments," have been the subject of much investigation and interest. As is well known to those having skill in the art, object oriented programming systems are composed of a large number of "objects." An object is a data structure, also referred to as a "frame," and a set of operations or functions, also referred to as "methods," that can access that data structure. The frame may have "slots," each of which contains an "attribute" of the data in the slot. The attribute may be a primitive (such as an integer or string) or an object reference which is a pointer to another object. Objects having identical data structures and common behavior can be grouped together into, and collectively identified as a "class."

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances traditionally have been established during "build time" or generation of the object oriented computing environment, i.e., prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e., the ancestor). The data structure of the child class includes all of the attributes of the parent class.

Two articles providing further general background are E. W. Dijkstra, *The Structure of "THE" Multiprogramming System*, Communications of the ACM, Vol. 11, No. 5, May 1968, pp. 341-346, and C. A. R. Hoare, *Monitors: Operating Systems Structuring Concepts*, Communications of the ACM, Vol. 17, No. 10, October, 1974, pp. 549-557, both of which are incorporated herein by reference. The earlier article describes methods for synchronizing using primitives and explains the use of semaphores while the latter article develops Brinch-Hansen's concept of a monitor as a method of structuring an operating system. In particular, the Hoare article introduces a form of synchronization for processes and describes a possible method of implementation in terms of semaphores and gives a proof rule as well as illustrative examples.

As set forth in the Hoare article, a primary aim of an operating system is to share a computer installation among many programs making unpredictable demands upon its resources. A primary task of the designer is, therefore, to design a resource allocation with scheduling algorithms for resources of various kinds (for example, main store, drum store, magnetic tape handlers, consoles). In order to simplify this task, the programmer tries to construct separate schedulers for each class of resources. Each scheduler then consists of a certain amount of local administrative data, together with some procedures and functions which are called by programs wishing to acquire and release resources. Such a collection of associated data and procedures is known as a monitor.

The adaptive communication environment (ACE) is an object-oriented type of network programming system developed by Douglas C. Schmidt, an Assistant Professor with the Department of Computer Science, School of Engineering and Applied Science, Washington University. ACE encapsulates user level units and WIN32 (Windows NT and Windows 95) OS mechanisms via type-secured, efficient and object-oriented interfaces:

- PC mechanisms—Internet-domain and UNIX-domain sockets, TLI, Named pipes (for UNIX and Win 32) and STREAM pipes;
- Event multiplexing—via select( ) and poll( ) on UNIX and WaitForMultipleObjects on Win 32;
- Solaris threads, POSIX Pthreads, and Win 32 threads;
- Explicit dynamic linking facilities—e.g., dlopen/dlsym/dlclose on UNIX and LoadLibrary/GetProc on Win 32;
- Memory-mapped files;
- System VIPC—shared memory, semaphores, message queues; and
- Sun RPC (GNU rpc++).

In addition, ACE contains a number of higher-level class categories and network programming frameworks to integrate and enhance the lower-level C++ wrappers. The higher-level components in ACE support the dynamic configuration of concurrent network daemons composed of application services. ACE is currently being used in a number of commercial products including ATM signaling software products, PBX monitoring applications, network management and general gateway communication for mobile communications systems and enterprise-wide distributed medical systems. A wealth of information and documentation regarding ACE is available on the worldwide web at the following universal resource locator:

http://www.cs.wustl.edu/ . . . schmidt/ACE-overview.html.

The following abbreviations are aor may be utilized in this application:

- Thread—a parallel execution unit within a process. A monitor synchronizes, by forced sequentialization, the parallel access of several simultaneously running Threads, which all call up functions of one object that are protected through a monitor.
- Synchronizations-Primitive—a means of the operating system for reciprocal justification of parallel activities.
- Semaphore—a Synchronizations-Primitive for parallel activities.
- Mutex—a special Synchronizations-Primitive for parallel activities, for mutual exclusion purposes, it includes a critical code range.
- Condition Queue—an event waiting queue for parallel activities referring to a certain condition.
- Gate Lock—a mutex of the monitor for each entry-function, for protection of an object, for allowing only one parallel activity at a time to use an Entry-Routine of the object.

Long Term Scheduling—longtime delay of one parallel activity within a condition queue or event waiting queue for parallel activities.

Broker—a distributor.

In addition, the following acronyms are or may be used herein:

AFM Asynchronous Function Manager
SESAM Service & Event Synchronous Asynchronous Manager
PAL Programmable Area Logic
API Application Programmers Interface
IDL Interface Definition Language
ATOMIC Asynchron Transport Optimizing observer-pattern-like system supporting several Modes (client/server-push/pull) for an IDL-less Communication subsystem, described herein
XDR External Data Representation
I/O Input/Output
IPC Inter Process Communication
CSA Common Software Architecture (a Siemens AG computing system convention)
SW Software

SUMMARY OF THE INVENTION

The present invention provides a main module that is independent of the software domain and which can be dynamically configured or reconfigured at runtime by domain specific dynamic link libraries.

Modem operating systems, such as Microsoft Windows NT, provide support for dynamically configurable kernel-level device drivers. Similarly, CSA (Common Software Architecture (a Siemens AG computing system convention) provides different program components in OCX format. These can be linked into and unlinked out of the application dynamically. This makes it possible to reconfigure the application without having to recompile and relink new components into the application.

This is acheived by the use of a service configurator pattern. The service configurator pattern resolves the following issues:

The need to defer the selection of a particular type or particular implementation of a service until very late in the design cycle. This allows developers to concentrate on the functionality of a service without committing themselves prematurely to a particular service configuration. By decoupling functionality from a services configuration, the service configuration pattern permits applications to evolve independently of the configurations policies and mechanisms of the system.

The need to build complete applications or systems by composing multiple independently developed services. The service configuration pattern requires all services to have a uniform interface. This allows the services to be treated as building blocks which can be easily put together as components of a large application. The uniform interface across all the services makes them "look and feel" the same with respect to how they are configured and this makes developing applications simpler.

The need to optimize, reconfigure and control the behavior of a service at run-time. Decoupling the implementation of a service from its configuration makes it possible to fine-tune certain implementation of configuration parameters of services. For instance, depending on the parallelism available on the hardware and the operating system, it may be more or sess efficient to run one or more services in separate threads or processes. The service configuration pattern enables applications to control these behaviors at run-time, when more information may be available to help optimize the services.

DETAILED DESCRIPTION OF THE PREFERRED EMBODIMENTS

Figure 1:
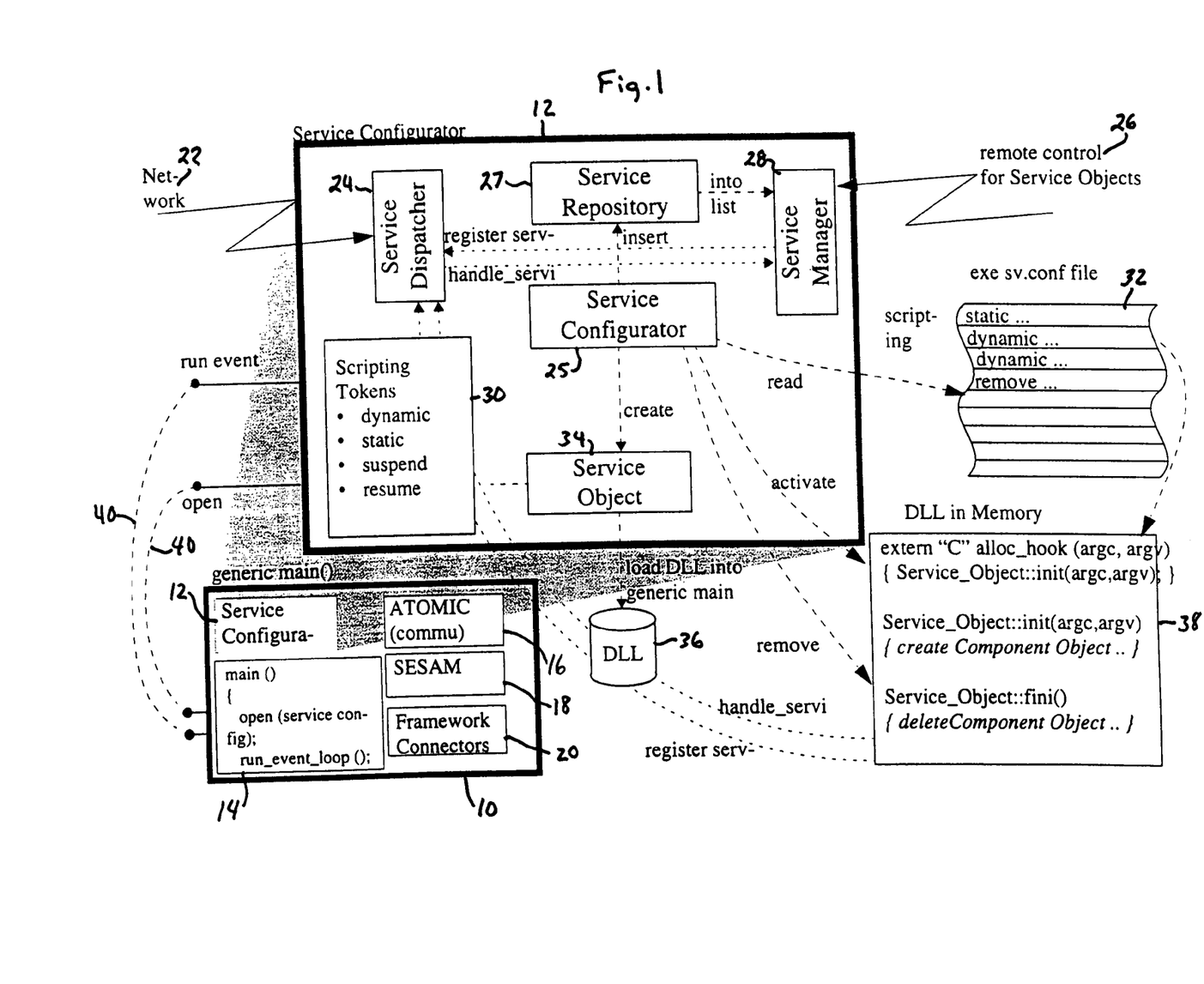
FIG. 1 is a schematic block diagram showing the generic main and including an exploded view of the service configurator component of the generic main.

FIG. 1 shows a generic main ( ) 10 according to the present invention. The generic main 10 includes a services configurator 12, a main ( ) component 14, an ATOMIC component 16 (which is disclosed in further detail in co-pending U.S. patent application Ser. No. 08/676,859, filed Jul. 3, 1996, now U.S. Pat. No. 6,275,871 which is incorporated herein by reference), a SESAM component 18 (which is disclosed in further detail in co-pending U.S. patent application Ser. No. 08/675,616, filed Jul. 3, 1996, now U.S. Pat. No. 6,012,081 which is incorporated herein by reference), and a framework connectors component 20.

FIG. 1 also shows an enlarged view of the services configurator component 12 of the generic main ( ) 10. The services configurator provides dynamic linking of component DLLs (dynamic link libraries) into the generic main ( ) 10. Within the service configurator 12 are objects shown as blocks, these being linked by methods activations shown as dashed lines. A network 22 communicates to the service configurator 12 through a service dispatcher 24 and remote control of services objects 26 is communicates through a service manager 28 from outside the service configurator 12. Scripting tokens 30 provided definitions that are bound to the services objects, which are singleton objects. Scripting results in an executable services configuration file 32. In the illustrated executable services configuration file is shown the methods, static, dynamic (twice), and remove. The methods within the illustrated service configurator include: "register service" and "handle service" between the service dispatcher 24 and the service manager 28, "insert" from a service configurator 25 to the service repository 27, "into list" from the service configurator 25 to the service manager 28, "read" from the service configurator 25 to the executable service configuration file 32, "activate" and then "remove" from the service configurator 25 to the DLL in memory 38, "create"

from the service configurator 25 to the service object 34, and "handle service" and "register service" between the DLL 38 and the scripting tokens 30.

Service objects 34 are created, which load DLLs into the executable generic main at runtime, as indicated at 36. An example of an internal view of a DLL in memory is shown at 38, including program statements providing an allocation hook into the DLL, use of the init function to activate the DLL thereby creating a component object, and finally removal of the DLL using the fini function to delete the component object.

The connection between the service configurator 12 and the generic main 10 is illustrated by the links 40. First the open function is initiated and then the run event loop is called.

The present invention is thus based on a service configuration pattern. The service configuration pattern provides the benefits of:

Centralized administration: The service configuration pattern combines one or more services to a single administrative unit. This simplifies development by automatically performing common service initialization and termination activities, such as opening or closing of files. It also makes it possible to centralize the administration of network services by using a uniform set of configuration operations such as initialize, suspend, resume, and terminate, and to query application components.

Increased modularity and reuse: The service configuration pattern helps to decouple the implementation of services from the configuration of the services and, as such, improves modularity and reusability of the services. All services have uniform interface by which they are configured, which encourages reuse.

Increased configuration dynamism: The service configuration pattern makes it possible to dynamically reconfigure a component without modifying, recompiling or relinking the existing code. Additionally, it is possible to reconfigure a component or other components without influencing other co-located components.

Increased opportunities for tuning and optimization: The service configuration pattern provides an increased range of configuration alternatives to developers. Services functionality is decoupled from the execution agent, which is the generic main, that is used to invoke the service. Developers can adaptively tune daemon concurrency levels to meet client demands. Examples of alternatives include spawning a thread or process at the arrival of a client request or at the creation time.

Increased security of executables in avoiding the usage of process global data. Users can bring functionality into the generic main only in components, which have a set of initialization and finalization hooks.

Figure 2:
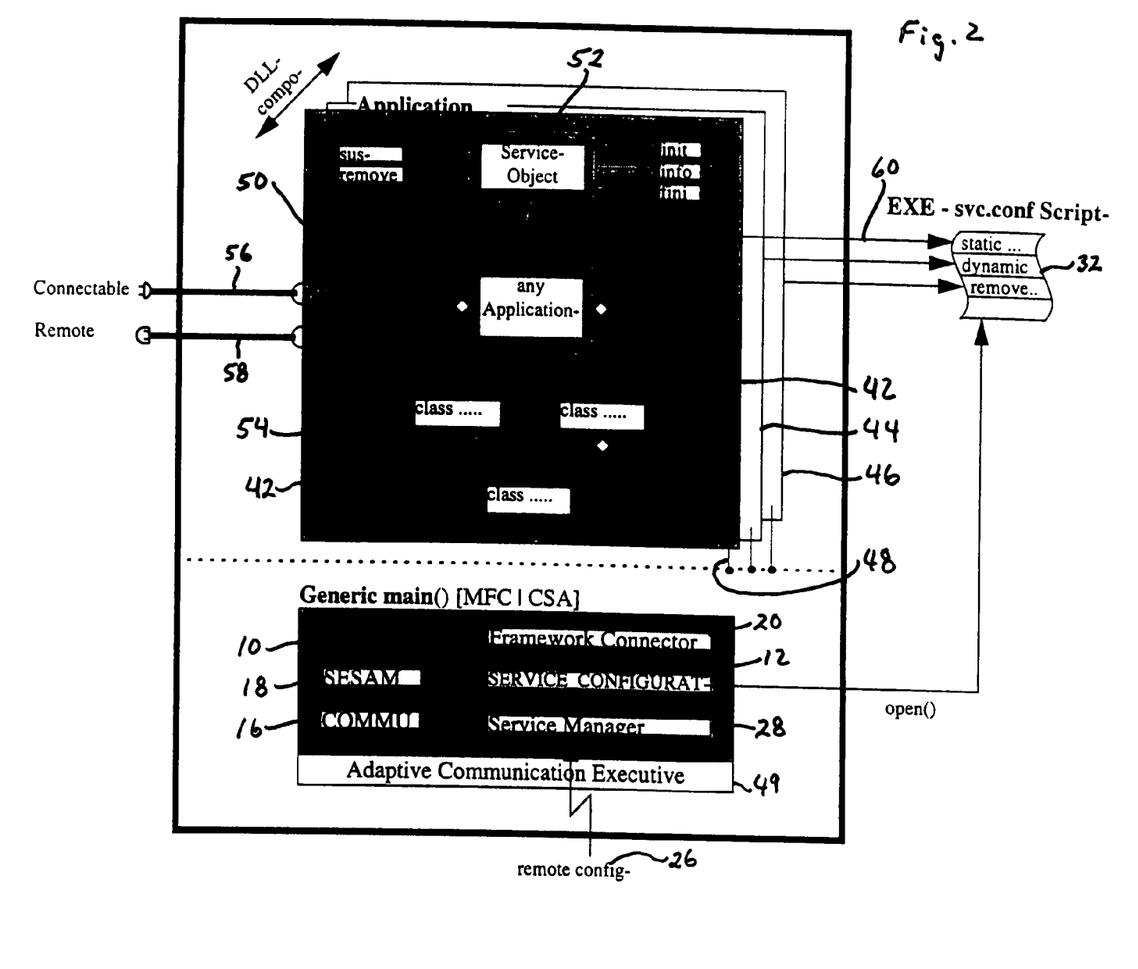
FIG. 2 is a schematic block diagram showing the detail of application interacting with the service objects as loaded by the generic main.

FIG. 2 shows how a generic main ( ) is enriched by inheritance from a basic workwide event communication mechanism, or ATOMIC. An executable template is shown, including DLL components that are loaded from disk as DLLs (dynamic link libraries). On application component 42 is illustrated as a shaded box including a service object 52 with the functions discussed in conjunction with FIG. 1, including suspend, remove, init, info and fini. An application object is shown as any application 50, which is derived from a service object. Further objects identified as class . . . 54, two of which connect to the outside world through links marked connectable 56 and remote 58. The connectable link 56 is a supplier and the remote 58 is a consumer. Male and female connectors are shown at the end of the links to indicate the possibility of connection to these links. The application component 42 fills up the executable configuration script 32, which is an ASCII file.

Additional pages 44 and 46 show that many DLL components are provided. The present invention thus utilizes the concept of component ware. Each of the components 42, 44 and 46 write to the executable file 32. These components 42, 44, and 46 are loaded with the help of the generic main ( ) 10, as shown by the links 48. The generic main 10 includes the parts discussed in conjunction with FIG. 1. The service configurator 12 can be seen performing the "open ( )" function on the executable service configuration file 32. An adaptive communication executive (ACE) 49 is provided as a framework for the generic main as a compile time link.

Figure 3:
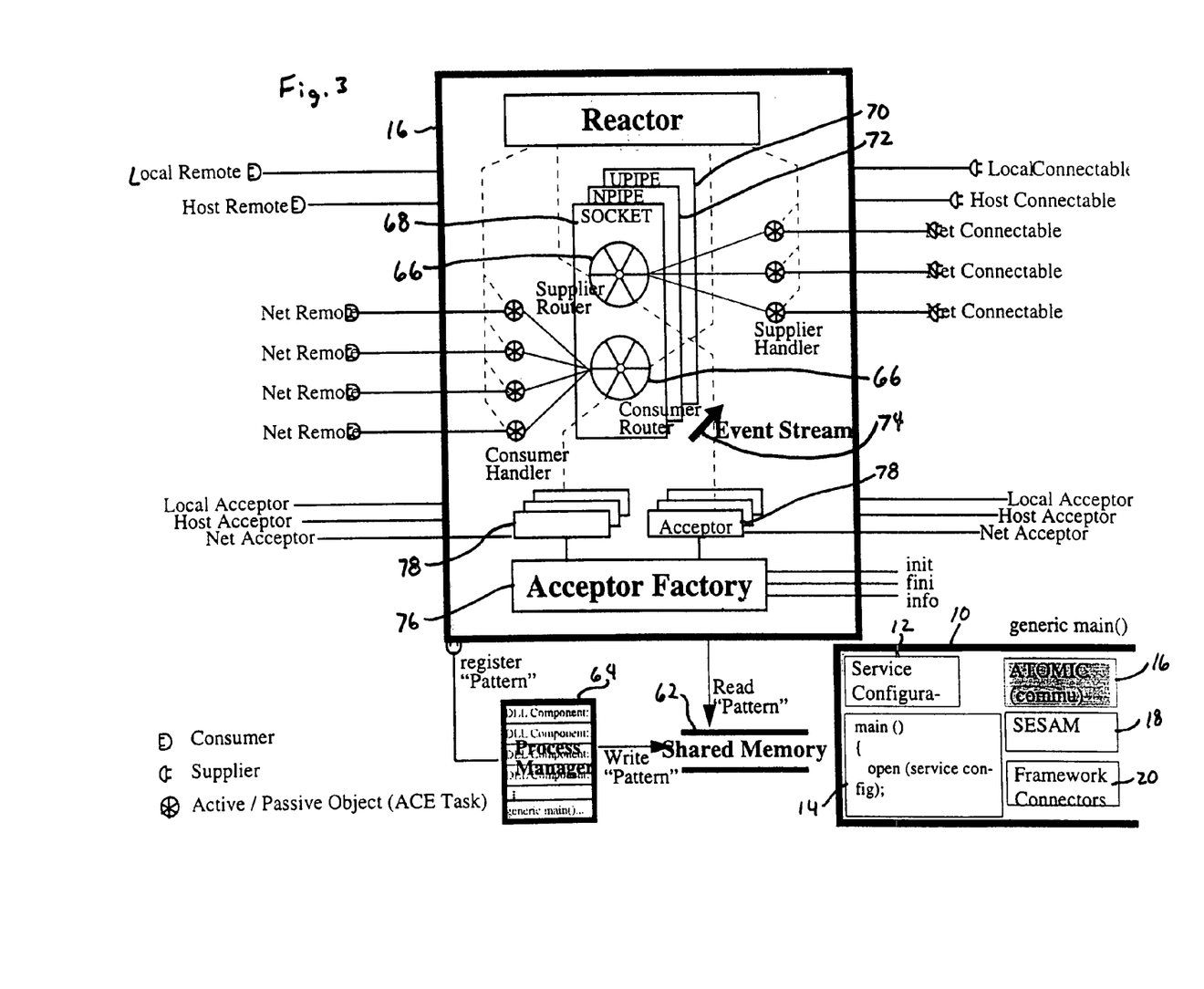
FIG. 3 is a schematic block diagram showing the communication portion "commu" of the ATOMIC element of the present invention.

The communication component "commu" 16 is shown in FIG. 3. This provides a dynamically configurable event service pattern. Shared memory 62 is accessed to read and write patterns, which are string names. These stringified patterns are thereby storing in the shared memory so that the name space is filled. Writing being carried out through a process manager 64 which performs a supervisory function. The communicator 16 shows the simplified communication which is possible via this framework via software ics. Local remote, host remote and net remotes are consumers, local connectable, host connectable and net connectables are suppliers.

Communications between these are handled through queues 66. The supplier router queue and consumer router queue are shown on the socket 68, that provides communications over machine boundaries. A upipe 70 is provided as an internal communication facility and an npipe 72 is provided for node loader communications within the operating system but over component boundaries. The communications are within separate threads. The upstream and downstream direction of the threads is indicated by the arrow 74.

An acceptor factory 76 (which is a tool in ACE) provides acceptors 78 to make communications available. It can be seen that the acceptor factory 76 can implement the init, fini and info functions as components. A reactor heads the communication part.

Figure 4:
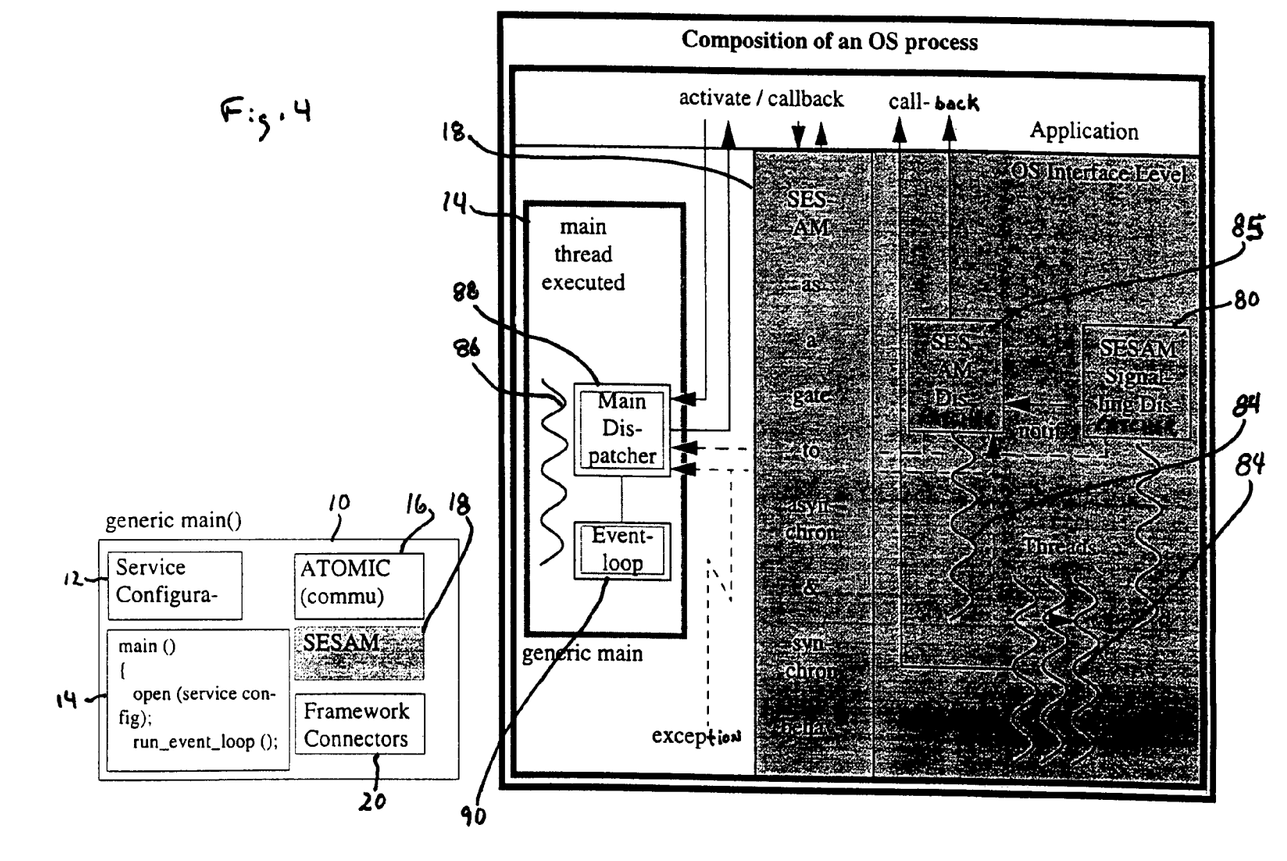
FIG. 4 is a schematic block diagram showing the SESAM component of the invention.

FIG. 4 provides a generic main enriched by a sync/async management pattern SESAM, such as disclosed in co-pending U.S. patent application Ser. No. 08/675,616, filed Jul. 3, 1996, now U.S. Pat. No. 6,012,081 which is incorporated herein by reference. The SESAM signaling dispatcher 80 is a reactor, the SESAM dispatcher 82 is an asynchronous timer handler and thread 84 are shown running in parallel within the executable file to provide concurrencies of operation. The main thread 86 is executed. A main dispatcher 88 regulates activities in the executable file along with an event loop 90, and SESAM provides a gate to synchronous and asynchronous behavior at an application/operating system interface via activations and call-backs. The control of the operation is reverse compared to the traditional control using the so-called Hollywood principle, i.e. don't call us, we'll call you.

The synchronous/asynchronous pattern permits the execution of functions asynchronously, the scheduling of synchronous timers, the scheduling of asynchronous timers, the handling of exceptions, the provision of a general synchronization interface for communication events, waits for a list of events, and a synchronization of multiple dispatchers.

Figure 5:
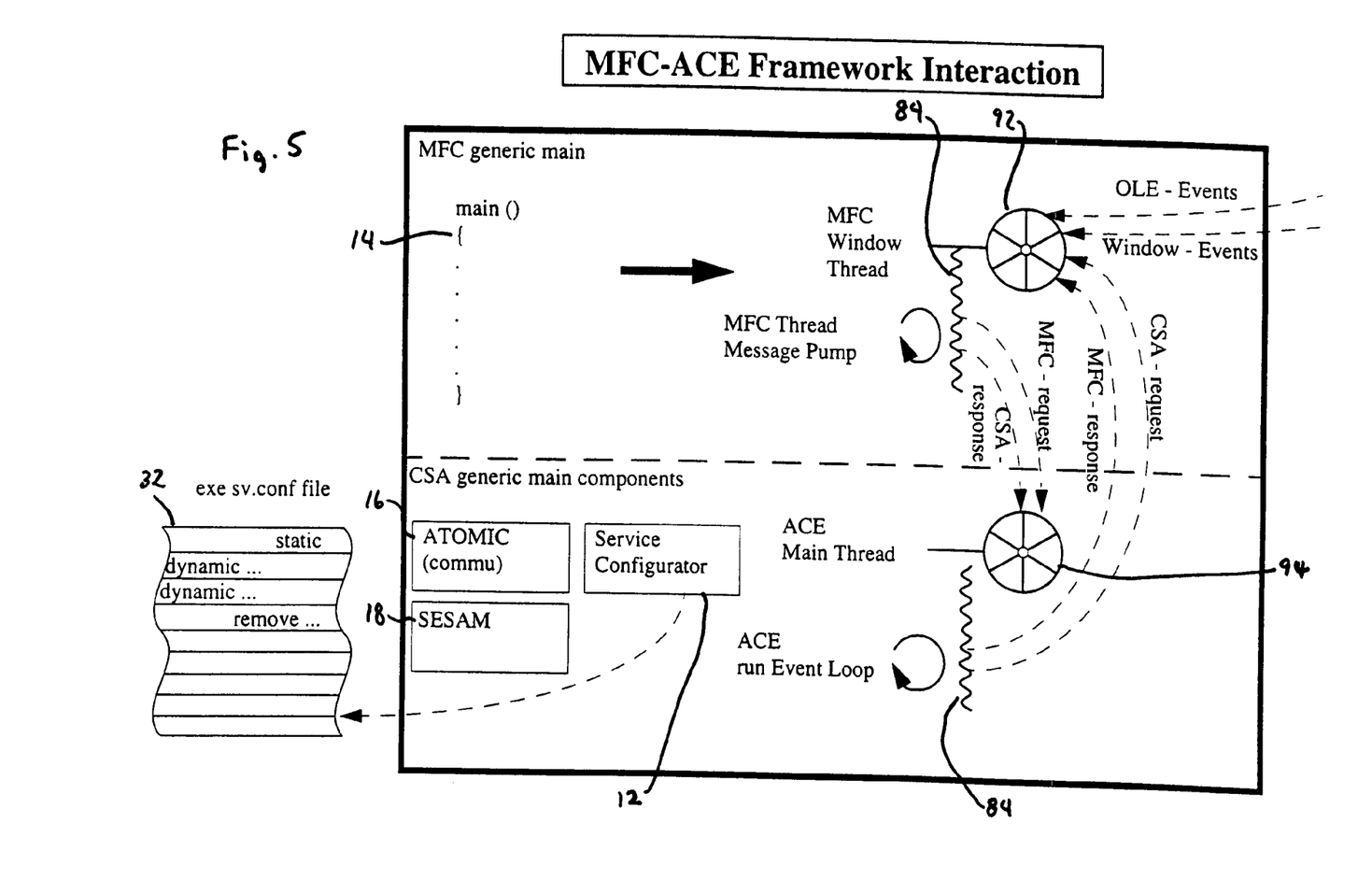
FIG. 5 is a schematic block diagram showing the framework connectors component of the invention.

There are two goals of the generic main, namely interconnecting frameworks (ACE and MFC), and creating a main program which can never be changed by an application programmer. The coupling of MFC and ACE main message pumps is shown in FIG. 5. Every thread has its own message pump. The message pump of the MFC is hidden behind the scenes, while the message pump of the ACE is attached to an ACE_Task object.

The MFC generic main has an MFC window thread connected to a queue 92 in the illustrated example. The MFC thread message pump loops at this thread. OLE (object linking and embedding) events and windows events are received at the queue 92 and CSA and MFC requests and responses interact with a queue 94 in the CSA generic main components running an ACE main thread. The FIG. 5 thus illustrates a framework interaction via two message queues.

MFC to ACE communications possibilities are as follows. An abstract base class implements a generic main base functionality which could be extended by deriving from this class an added functionality. Both the hook functions of the generic main base class are helpful. They could be placed before a dispatch loop will start and the second hook will be called after the dispatch loop is ready.

The functionality of the MFC framework is used. The entry point here is the post-message method. The notification of the method is, for example, as follows:

BOOL PostMessage (

HWND hWnd, /handle of destination window
   UINT Msg,//message to post
   WPARAM wParam,// first message parameter
   LPARAM lParam// second message parameter
)

The parameters are defined as follows:

HWND hWnd: The handle of the recipient window

UINT Msg: the identifier of the user defined message,

WPARAM wParam: the first parameter of the message, and

LPARAM lParam: the second parameter of the message, which is used to transfer the name of the loaded components from ACE to MFC.

The service configuration of DLL and OCX components is explained hereinafter. The service configurator of the ACE framework is used to load all software components.

To load OCXs, the code of the OCX project must be modified. This allows for loading of Microsoft Componentware as well.

Figures 6A, 9:
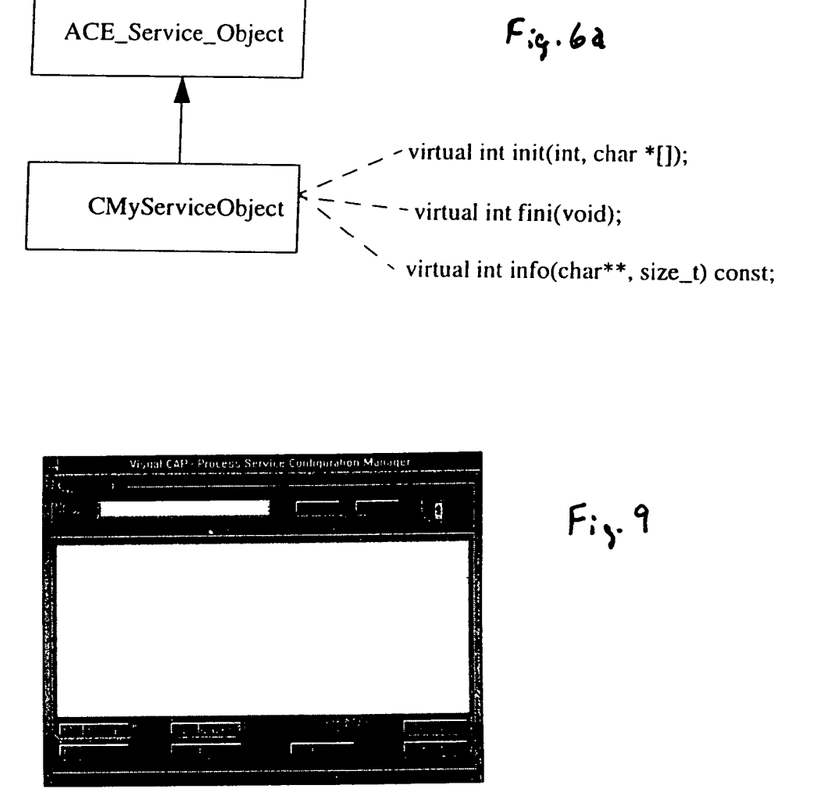
FIG. 6a is a block diagram of an object relationship and FIG. 6b is a dialog window showing loading of a service configuration.
FIGS. 9-13 are dialog boxes in a windows operating system showing use of a service configuration manager.

The basic steps are:

1. Define an additional class, derived from ACE_SERVICE_OBJECT (see FIG. 6a)

2. The init- and fini- methods will remain empty.

3. The info method is the most essential part,
   Each OCX has its own name identifying the component in the system registry. This name must be returned by the info- method. For example, int MySecondServiceObject::into(char**name, size_t) const
{
strcpy (*name, "SECONDOCX.SecondOCXCtrl.1");
return (0);
}

Additionally, an entry in the service configuration file must be entered, which will be explained hereinafter.

Figure 6B:
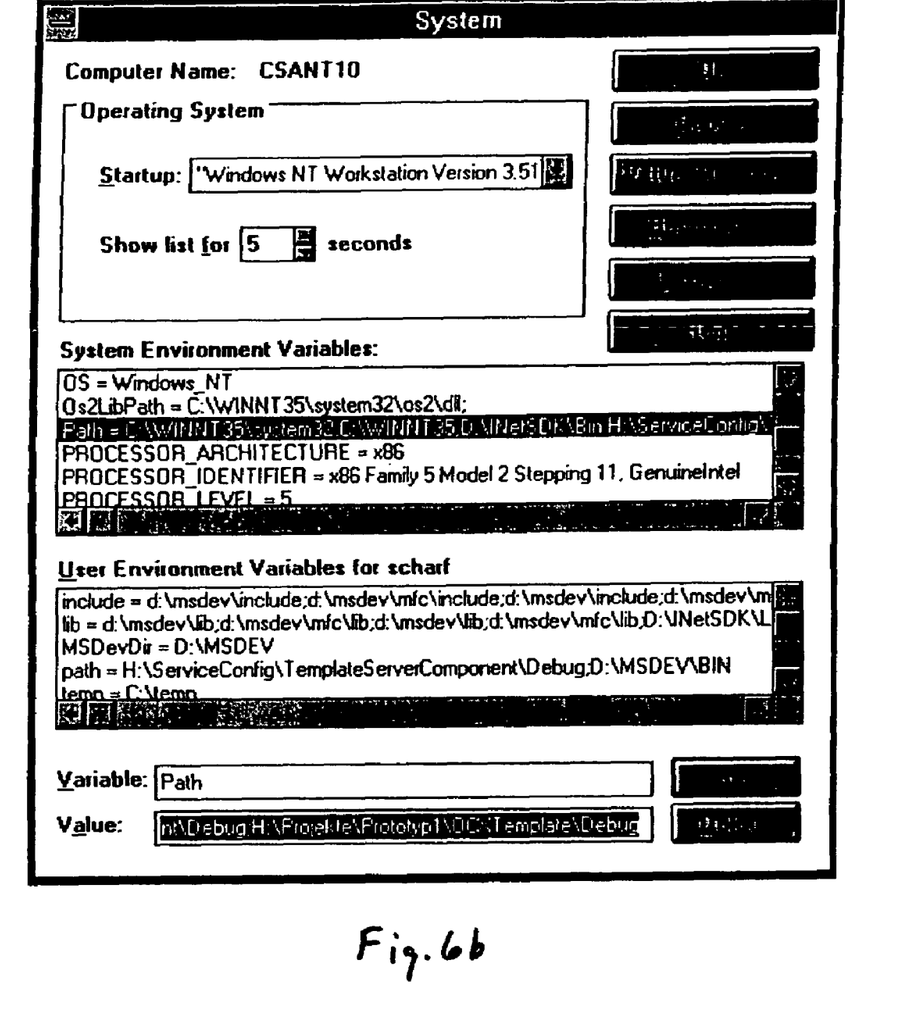

Refer to FIG. 6b for a view of the windows dialog box for the pathing of the DLLs and OCXs in the Main/Control Panel/System of the Microsoft NT platform. The runtime linker uses the path environment variable for the search. The path of the component is required to be entered into the path variable.

Figure 7:
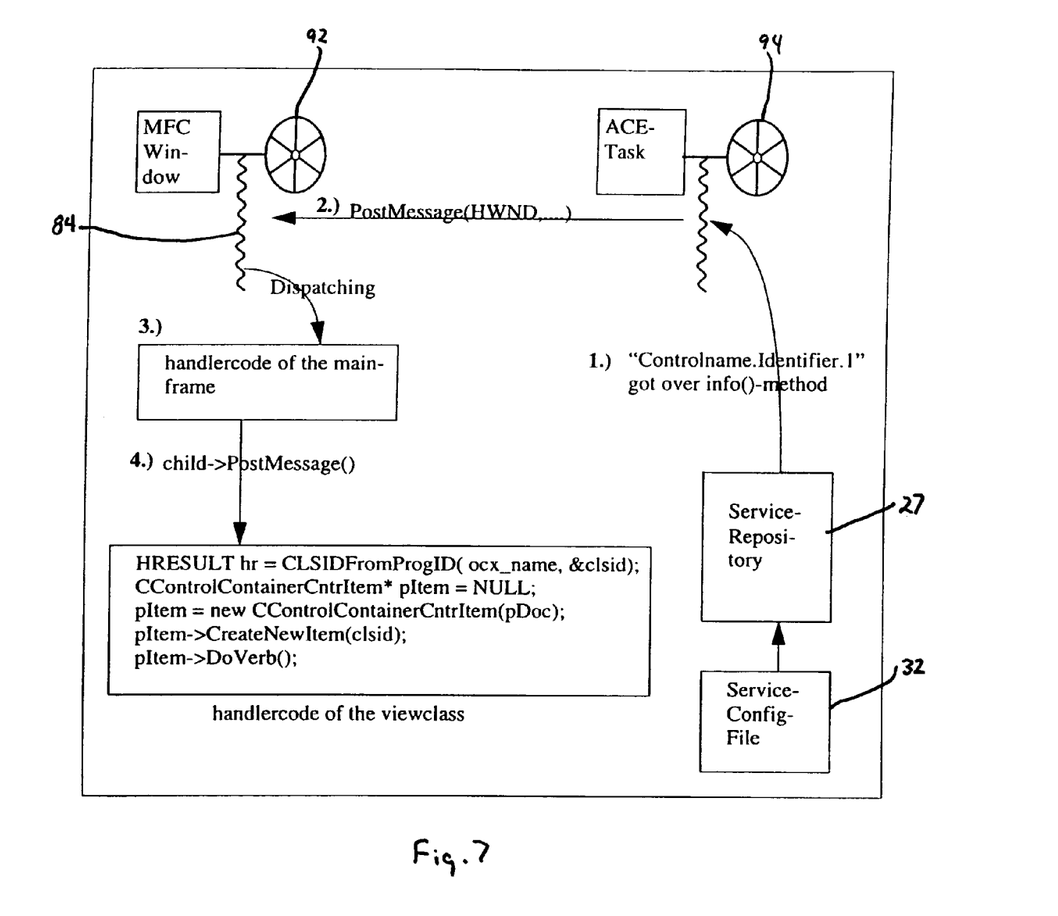
FIG. 7 is a schematic block diagram showing the loading of OCX components.

The mechanism for loading OCXs is shown in FIG. 7. This provides the protocol for generic main component loading when supporting third party main modules. Note the use of the postmessage function between the threads.

Figure 8:
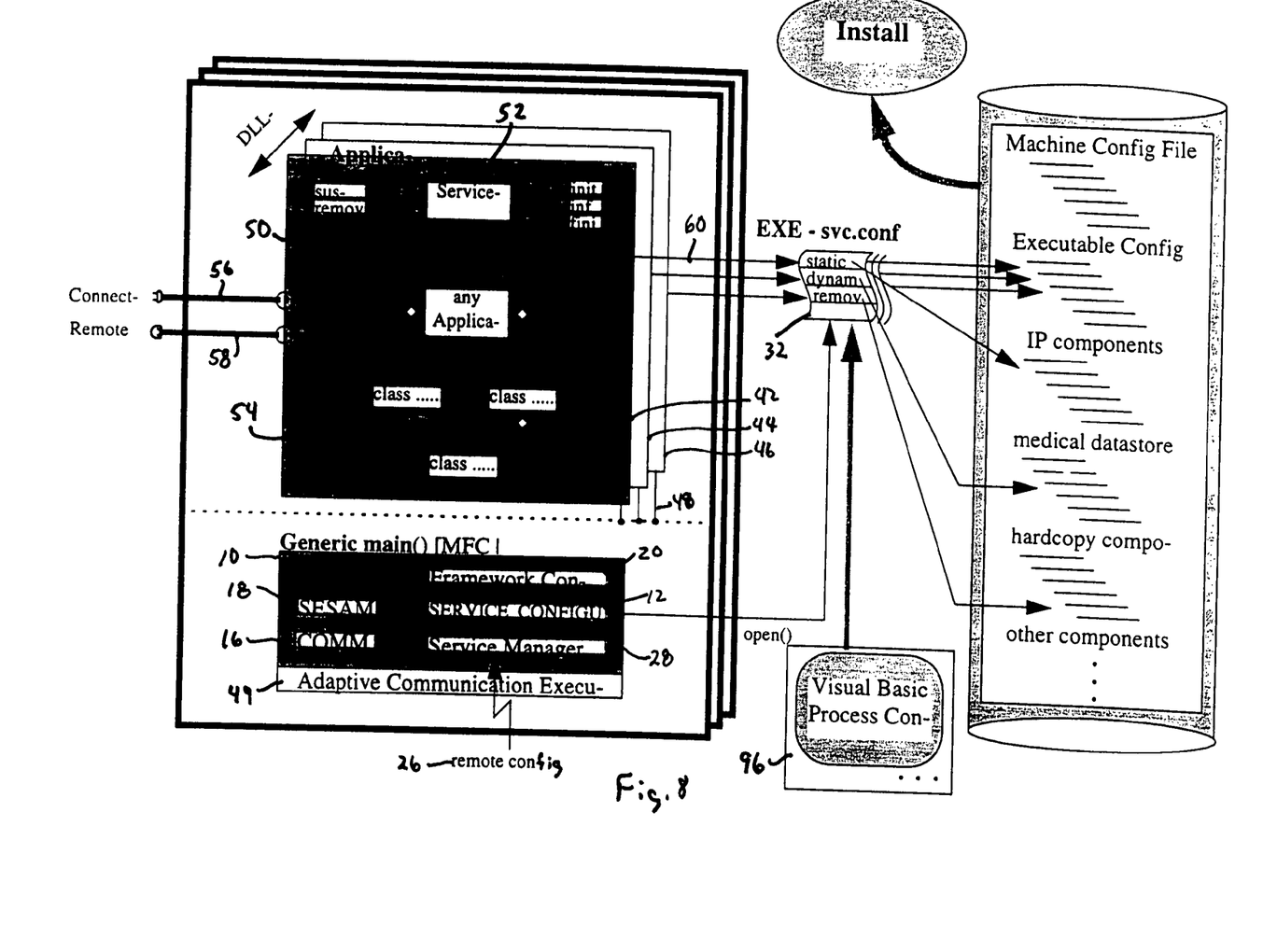
FIG. 8 is a schematic block diagram showing a whole machine utilizing the generic main in a variety of components.

A computer running different generic mains as configured by various component DLLs is shown in FIG. 8. A visual basic controller 96 supervises the whole machine. The executable service configuration file is loaded into may different components, as shown by the arrows.

The service configuration framework uses a configuration file, such as svc.conf, to guide the configuration and reconfiguration activities of a process. Each of these processes has therefore to be associated with a distinct configuration file.

Each service config entry in the file begins with a service config directive that specifies the action to be performed. Each entry contains certain attributes that indicate the location of the shared objects file for each dynamically linked object and parameters as well. The latter may be needed to initialize the service at run-time.

The primary syntactical elements in a config-file are presented below in Backus/Naur format (EBNF):

<svc-config-entries> ::=svc-config-entries svc-config-entry |NULL

<svc-config-entry> ::= <dynamic> | <static> | <suspend>| <resume>|

<remove>| <stream> | <remote>

<dynamic> ::= DYNAMIC <svc-location> [<parameters-opt>)<]

<static> ::= STATIC <svc-name>[<parameters-opt>]

<suspend> ::= SUSPEND <svc-name>

<resume> ::= RESUME <svc-name>

<remove> ::= REMOVE <svc-name>

<stream_ops> ::= <dynamic> | <static>

<remote> ::= STRING '{' <svc-config-entry>'}'

<module-list> ::= <module-list> <module> | NULL

<module> ::= <dynamic> | <static> | <suspend> | <resume> | <remove>

<svc-location> ::= <svc-name> <type> <svc-initializer> <status>

<type> ::= SERVICE OBJECT '*' |MODULE '*' |STREAM '*' |NULL

<svc-initializer> ::= <object-name> | <function-name>

<object-name> ::= PATHNAME ':' IDENT

<function-name> ::= PATHNAME ':' IDENT '(' ')'

<status> ::= ACTIVE | INACTIVE | NULL

<parameters-opt> ::= STRING | NULL

To illustrate how the Service Configurator framework is used in practice to simplify distributed application development, the following example config file shows you the basic architecture of the configuration file.

example file static ACE_Svc_Manager"-d -p 3333"

dynamic MySegmentObject1 Service_Object * ocx_ NEU.ocx:_alloc ( )

"Segment"

dynamic MyBrowserobject1 Service_Object * Browser.ocx: _alloc ( )

"Browser"

This sample file contains a comment line at the beginning. The ACE_Svc_Manager is loaded statically and the 2 Objects, one Segmentviewer and a Patientbrowser, are linked dynamically. Both of them could be removed or be replaced by another (i.e. a newer version of the) Object without the need of a new compilation or linking of the application. To do so, you just have to give another directive and force the framework to read the and process the directive:

remove MySegmentObject1

The program description of the SVCman (service configuration manager) will now be given.

The Service Configuration Manager is a software-tool that allows you to create and modify your Service Config files in a comfortable way. See FIG. 9 for a window displayed on a computer monitor showing the process service configuration manager.

According to the service configuration framework, the SVCman supports the following service config directives:

| symbol | description |
| --- | --- |
| dynamic | Dynamically link and enable a service |
| static | Enable a statically linked service |
| remove | Completely remove a service |
| suspend | Suspend a service without removing it |
| resume | Resume a previously suspended service |
| stream | Configure a stream into a deamon |
| string | Configure a remote facility |

In addition to that the SVCman is also designed to work with a ProcessManager, that allows you to define and change the configuration for a specific process dynamically.

If the corresponding process of the current Service Config file is not running, this is not a problem at all. In this case the Service Config file will only be written to disk and the changes take effect when the process is started the next time. Nevertheless the old file will be saved as *.old file.

If the process is currently running and the changes should take effect in advance one has to develop an alternative. The SVCman then generates a Delta file (* delta) which holds the necessary directives to bring the Service Configuration Framework to the changed status. When the process is started the next time, it will be of course defined corresponding to the new Service Config file.

How to Create a new config file

When SVCman is started, the workspace is cleared and you are able to edit your new file. The filename will have to be specified when the created file is saved to disk.

If the workspace is not empty because a file was loaded etc. simply click the Clear all button.

Editing a config file

Add Service

Figure 10:
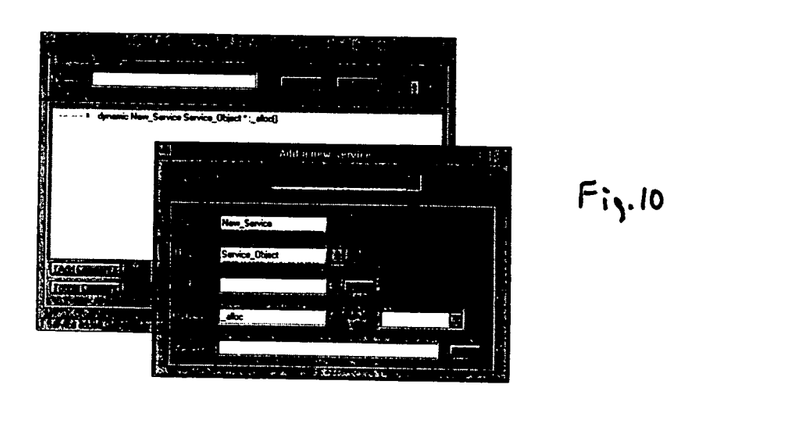

By clicking the corresponding button the form for adding a service will be opened. In the background the new Service entry will become visible. The service will be added into the file after the marked entry. This is shown in FIG. 10 as a dialog box entitled "add new service".

Now you can specify the service you want to add by filling out the entries in the Property form. Please refer to the description of the entries in the following table.

| Entry | Description |
| --- | --- |
| Service | defines the kind of service |
| Name | Name of service |
| Type | Type of Service-object (service object, module, stream) |
| Lib-File | Filename of library which holds the desired function |
| Function | Name of function of the service entry in the DLL |
| Status | Status of service (active, inactive) |
| Parameter | optional parameterstring |

Note that the Enter key will act as the Window-Close button and thus close the form. You do not have to press Enter at the end of each entry-field. The changes you make will be updated in any case.

The Browse button helps you to find the correct name of the library by showing you a list of the currently available ones in the specified path.

According to naming conventions there must not be blanks (SPACE) inside name-fields, these are therefore depressed.

As the Service Configurator Framework uses double quotes (") to indicate the start and the end of a parameter there must not be double quotes inside the parameter-field. They are therefore depressed.

For a correct definition of a service all fields in the form have to be filled. Several types of services do require only one or two entries. The not required ones are disabled by program.

During editing the Service Property form, the main form is disabled.

Figure 11:
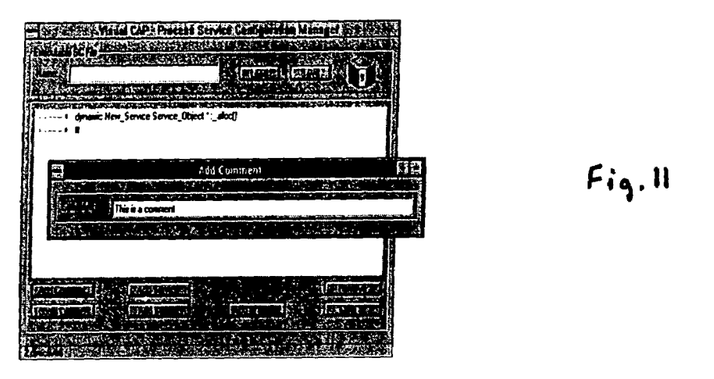

Add Comment is shown in FIG. 11.

With Add Comment you can simply mark a line for comment and thus give some remarks on the entries of the config-file. This clearly enhances the readability of the file.

Toggle Comment

Sometimes it can be useful to disable a made entry simply by declaring it as comment and not to remove it completely. By clicking the button the marked line will become a comment regardless of the kind of the specified service. By clicking the button again the comment will be removed and the original entry restored.

Add Stream

The SVCman allows you to create streams up and down to a daemon. This stream encapsulates several other well defined services. By using the button a new stream is placed after the marked position.

To add a service to the defined stream use the Add to module button.

Note that a stream can only be called statically or dynamically.

Inside a stream another module is not allowed, i.e. no stream inside a stream.

Add to Stream

As said above a stream defines something like a module which can hold several services. To add a service to a stream focus the stream and press the Add to module button. If there is yet a service inside the module you can also mark the position after which the new entry will be made.

The service-entries inside a module will be shown as tree.

Edit service

You can simply edit and change a service-entry just by double clicking on it. The Service Property form will then be evoked and you can change the specification.

Remove service

To remove a service from the service-config file, specify the service you want to delete and press the Remove Service button. You will be asked if you really want to remove it. By selecting YES the service will be deleted, CANCEL will bring you back.

Note that there is no UNDELETE, so be careful if a stream is marked the whole stream with module will be deleted if a service inside a module is selected, only this service will be removed from the stream-module.

Clear all

Use this Button to clear all entries and reset all.

Note that there is no UNDELETE, so be careful.

The filename will also be cleared and you will have to define a new one when you want to save the file.

Save a config file

Figure 12:
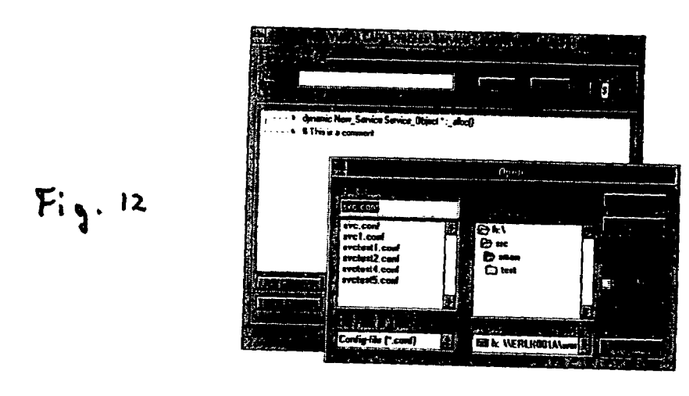

After editing or changing the file you can save your config file to disk. A common Windows Dialoghox will be opened and you have to specify the path and filename. This is shown in FIG. 12. The file will be stored as svc.conf by default.

If you have specified a different filename, the executable has to have the—f FILEPATH-FILENAME given or a Process Start Parameter If there is an existing file on disk it will be renamed into *.old, so you will not loose it and can restore it Note: As said above, the SVCman is also designed to work with a ProcessManager, that allows to define the configuration for a specific process dynamically. If therefore the corresponding process of the changed Service Config file is running, you will be asked if the changes you made should take effect in advance or not.

Load a config file

Figure 13:
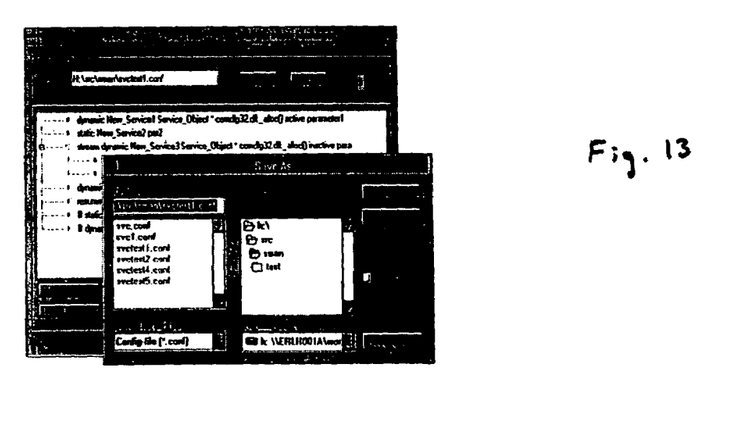

By clicking the Load button you can load other Service Config Files into the SVCman. If you do this while editing another file you will be asked if you want to save the old one first. An illustration of the save as dialog box is shown in FIG. 13.

If the file to load has not the right semantical form it cannot be read correctly by the SVCman. The program will cause the error "Cannot read file". In general one SPACE is required between the different object of the service entry. More SPACEs will be neglected.

If the specified file cannot be found on the disk the program will cause the error "File not found"

The SVCman can also be called with an optional commandline paramter. The specified file will then be loaded at the beginning Cut/Paste and Drag&Drop With the key INS and DEL you can perform Cut and Paste operations and also by simply dragging a line from one position to another you can change the position of an entry inside the file.

Note that the Cut/Paste function inside a module is not possible

The Insertion is always done before the selected position.

Attached is an appendix showing a program code listing in C++ for a generic main according to the present invention. The components shown in the listing include: a definition of the generic main, an implementation of the generic main functionality, as well as add ons to the generic main functionality. This generic main along with the service configurator and the framework interaction provide the advantages of the present invention.

Thus, the present invention provides an interpretative network daemon that is implemented by a generic main object. Only a binary executable is delivered including the following features.

it is object oriented it provides proper hidden instantiation of process wide singleton objects, such as for basic network communication features in ATOMIC basic sync/async management with SESAM basic dynamic linking features with component dynamic link libaries—DLLs basic network wide naming support basic network wide time base support basic network wide resource looking support basic network wide message logging support basic operating system abstraction layer (OSAL)

basic interface to a system configuration control (SCCM)

it provides support for full duplex event and request/response channels is provides generic connection to dominant GUI-framework supported main ( ) programs through the message pump interconnection protocol (MPIP)

provides generic connection to device drivers provides generic support of an object dip database (debugging port)

Although other modifications and changes may be suggested by those skilled in the art, it is the intention of the inventors to embody within the patent warranted hereon all changes and modifications as reasonably and properly come within the scope of their contribution to the art.

We claim:

1. A computer having a processor for executing an object oriented computer program stored in memory, the object oriented computer program comprising:

a generic main for hosting any kind of at least one of a presentation logic application component and a business logic layer component;

a configuration component for configuring the generic main at runtime, wherein said configuration component includes:

a service configurator for creating service objects by activation of dynamic link libraries, a service dispatcher that communicates with a network on behalf of the configuration component, a service manager that communicates with said service dispatcher for service registration and handling, and a service repository that communicates with said service configurator for insertion of the service objects; and a framework connector providing communications between said presentation logic application component and said business logic layer component and said configuration component, wherein said framework connector includes:

a socket for communication over machine boundaries, said socket including communications links to remote networks, a upipe for internal communication, said upipe including communications links within a component, and an npipe for communication between components, said npipe including communications links to other components.

2. An object oriented computer program as claimed in claim 1, wherein said generic main is independent of an operating system of the computer until configured by said configuration component.

3. A method of operating a computer, comprising the steps of:
- providing a generic main component including a framework connector, wherein said framework connector includes:
- a socket for communication over machine boundaries, said socket including communications links to remote networks, a upipe for internal communication, said upipe including communications links within a component, and an npipe for communication between components, said npipe including communications links to other components;
- configuring said generic main component at runtime with dynamic link libraries, including:
- generating a service configuration file, wherein said configuration file includes:
- a service configurator for creating service objects by activation of dynamic link libraries, a service dispatcher that communicates with a network on behalf of the configuration component, a service manager that communicates with said service dispatcher for service registration and handling, and a service repository that communicates with said service configurator for insertion of the service objects;
- loading the dynamic link libraries into the generic main component; and
- inserting the generic main component configured according to the service configuration file into programs running on said computer so that the programs on the computer are configured.

4. A computer having a processor for executing an object oriented computer program stored in memory, the object oriented computer program comprising:
- a generic main object for hosting any kind of at least one of a presentation logic application component and a business logic layer component;
- a configuration component for configuring the generic main object at runtime;
- a framework connector providing communications between said presentation logic application component and said business logic layer component and said configuration component;
- a service configuration manager for monitoring all active instances of said generic main object and activating loading of services or components in an active generic container; and
- an object oriented binary executable providing proper hidden installation of process wide singleton objects for:
- basic network communications for anonymous and asynchronous communication, basic synchronous/asynchronous management of the components in said generic main object, basic dynamic linking features with component dynamic link libraries, a basic operating system abstraction layer, a basic interface to a system configuration control, providing support for full duplex event and request/response channels, providing generic connection to dominant GUI-framework supported main programs through a message pump interconnection protocol, providing generic support of an object dump database (debugging port).

* * * * *